Figure 1:
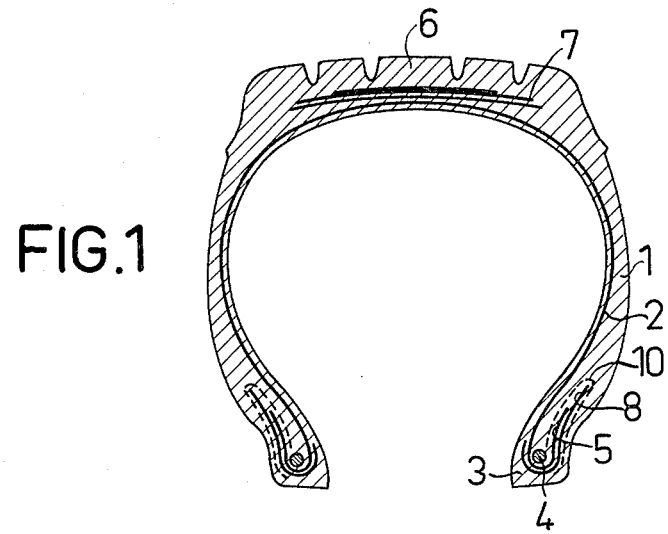

United States Patent [19]

Peter et al.

[11] 4,234,029
[45] Nov. 18, 1980

[54] PNEUMATIC VEHICLE TIRE

[75] Inventors: Julius Peter, Hanover; Heinz-Günter Drössler, Hemmingen; Willi Bachmann, Isernhagen, all of Fed. Rep. of Germany

[73] Assignee: Continental Gummi-Werke Aktiengesellschaft, Hanover, Fed. Rep. of Germany

[21] Appl. No.: 814,036

[22] Filed: Jul. 8, 1977

[51] Int. Cl.³ .................... B60C 9/00; B60C 15/00
[52] U.S. Cl. ..................... 152/354 RB; 152/362 R
[58] Field of Search ............ 152/354, 355, 362 R, 152/362 CS

[56] References Cited

U.S. PATENT DOCUMENTS

| | | | |
|---|---|---|---|
| 3,118,482 | 1/1964 | Beissner | 152/354 |
| 3,172,445 | 3/1965 | Boussu et al. | 152/354 |
| 3,205,931 | 9/1965 | Keefe, Jr. | 152/354 |
| 3,921,693 | 11/1975 | Suzuki et al. | 152/362 R |
| 4,067,373 | 1/1978 | Delobelle et al. | 152/362 R |

FOREIGN PATENT DOCUMENTS 408679  2/1966  Switzerland .......... 152/362 R

*Primary Examiner*—Stephen G. Kunin
*Assistant Examiner*—Lawrence E. Williams
*Attorney, Agent, or Firm*—Becker & Becker, Inc.

[57] ABSTRACT

A pneumatic vehicle tire having a single layer radial carcass of steel or a material of similarly high strength. The carcass is anchored by being looped around the bead cores in the beads. The laterally outwardly lying free ends of the carcass layer may extend up to about half the height of the tire side walls. Laterally outwardly, next to the looped around carcass end, between the rim flange and this carcass end, there is provided a bead reinforcer which includes pull-resistant threads or the like which are parallel to one another. The bead reinforcer is slanted with regard to the carcass, preferably extending at an angle of about 15° to 45° to the circumferential direction of the tire. The radially outwardly lying free end of the bead reinforcer has associated therewith a strip which extends parallel to said free end and includes pull-resistant threads or the like which are arranged in a cord layer. These threads are likewise slanted with regard to the circumferential direction of the tire, preferably forming an angle of about 15° to 45° with the circumferential direction, but, with regard to the bead reinforcer, are oppositely slanted, i.e. cross the threads of the bead reinforcer, in such a way that the freely ending, laterally looped around carcass end forms with the bead reinforcer and this strip a triangular formation which practically maintains the mutual spacing of the carcass strength carriers and the strength carriers of the bead reinforcer.

13 Claims, 5 Drawing Figures

PNEUMATIC VEHICLE TIRE

The present invention relates to a pneumatic vehicle tire having a single layer radial carcass of steel or a material of similarly high strength. The carcass is anchored by being looped around the bead cores in the beads. The laterally outwardly lying free ends of the carcass layer may extend up to about half the height of the tire side walls. Laterally outwardly, next to the looped around carcass end, between the rim flange and this carcass end, there is provided a bead reinforcer which comprises pull-resistant threads or the like which are parallel to one another. The bead reinforcer is slanted with regard to the carcass, preferably extending at an angle of about 15° to 45° to the circumferential direction of the tire.

The so-called bead reinforcer, as mentioned above, has threads or the like which extend at an angle to the strength carriers of the radial carcass and serve for reinforcement and fastening of the bead sections and the radially inwardly lying regions of the tire side walls. Although these sections of the tire side walls or the bead sections are stiffened or reinforced, more or less great deformations occur which result in a corresponding deformation of the bead reinforcer. With the heretofore known bead reinforcers, this deformation leads to an alteration of the mutual spacing of the individual threads or the like, especially at the edges which face the tire tread surface. These deformations are therefore a drawback because they can lead to premature destruction and especially to separations.

It is therefore an object of the present invention to improve pneumatic vehicle tires of the above mentioned general type in such a way that the above mentioned disadvantageous deformations of the radially outwardly lying edges of the bead reinforcer are largely prevented.

Figure 2:
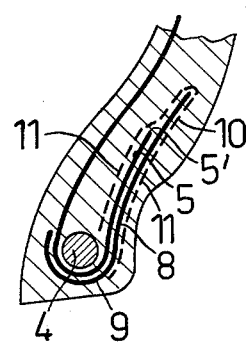
Figure 3:
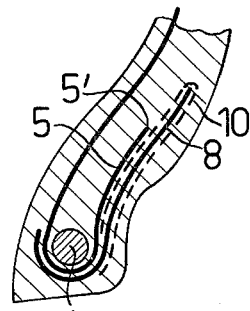
Figure 4:
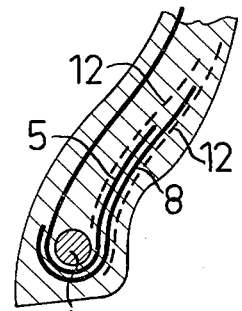
Figure 5:
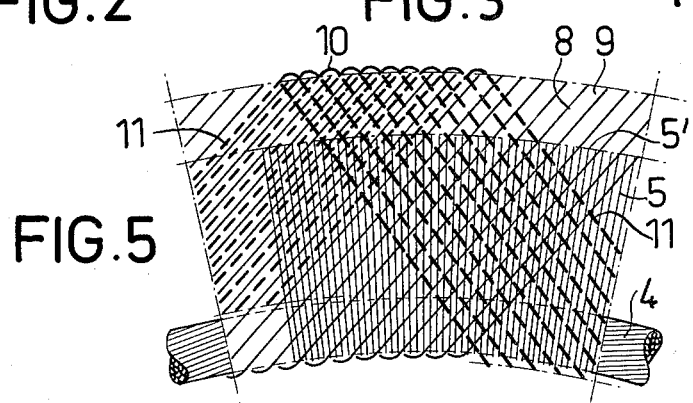

This object and other objects and advantages of the invention will appear more clearly from the following specification in connection with the accompanying drawing, in which:

FIG. 1 is a radial partial section of a pneumatic vehicle tire pursuant to the present invention;

FIGS. 2 to 4 are radial partial sections of different tire beads, with FIG. 2 showing the bead of the tire of FIG. 1; and FIG. 5 is a side view of the strength carriers of the bead of the tire of FIG. 1 or of the arrangement of FIG. 2, but merely shows the strength carriers which lie laterally on the outer side of the tire while omitting that section of the carcass which extends from one bead to the other bead without interruption.

The pneumatic vehicle tire pursuant to the present invention is characterized primarily in that the radially outwardly lying free end of the bead reinforcer has associated therewith a strip which extends parallel to said free end and comprises pull-resistant threads or the like which are arranged in a cord layer. These threads are likewise slanted with regard to the circumferential direction of the tire, preferably forming an angle of about 15° to 45° with the circumferential direction, but, with regard to the bead reinforcer, are oppositely slanted, i.e. cross the threads of the bead reinforcer, in such a way that the freely ending, laterally looped around carcass end forms with the bead reinforcer and this strip a triangular formation which practically maintains the mutual spacing of the carcass strength carriers and the strength carriers of the bead reinforcer.

It is a basic principle of the present invention, by the addition of a cord fabric strip in cooperation with the freely ending edges of the carcass, to influence the bead reinforcer and at the same time also the free end of the carcass layer in such a way that a mutual support results while forming a practically non-deformable triangular formation. This in turn results in the maintaining of a good connection of the freely ending threads or wires.

The preferred embodiment of the present invention is a U-shaped strip which surrounds not only the free end of the carcass but also the free end of the bead reinforcer. It may also be sufficient if the U-shaped strip only surrounds the free end of the bead reinforcer. Preferably, however, the above mentioned embodiment should be used so that the U-shaped strip surrounds not only the carcass end but also the bead reinforcer.

The above mentioned strip can extend radially inwardly to about the heel of the tire bead. This strip is preferably made of a textile material, especially a polyamide, while the bead reinforcer, in a manner known per se and just as the single layer carcass, is made of steel or of a material of similarly high strength. The effectiveness of the strip can be increased still further if with the U-shaped strip the space between the folded-over sections of the strip comprises a tough rubber mixture having a hardness of about 70 Shore A.

Referring now to the drawing in detail, the pneumatic vehicle tire which consists essentially of rubber or rubber-like material, has a radial carcass 1 which comprises steel wires 2 which extend in the radial direction. The steel wires 2 are anchored in the tire beads 3 by being looped around pull-resistant steel bead cores 4 located in the tire beads 3. The laterally looped around portion 5 of the carcass 1 has a pertaining edge 5'.

Between the carcass 1 and the tread strip 6 at the outer circumference of the tire, is located a pull-resistant belt 7 which extends essentially over the width of the tread strip 6.

Directly next to the looped around portion 5 is a bead reinforcer 8 of pull-resistant wires 9 as first strength carriers which are parallel to one another and which form an angle of about 15°–45°, such as 15° to 30°, with the circumferential direction of the tire. The bead reinforcer 8 is guided around the bead core 4 and projects beyond the free end 5' of the looped around portion 5.

Pursuant to FIGS. 1, 2 and 5, the looped around portion 5 and that portion of the bead reinforcer 8 which is parallel thereto are surrounded by a U-shaped strip 10 of pull-resistant threads as second strength carriers which are parallel to one another and comprise polyamide or the like. The arms 11 of the strip 10 thus extend parallel to the looped around portion 5 and to that portion of the bead reinforcer 8 which extends parallel to the looped around portion 5. The arms 11 end very close to the bead cores 4. The slope of the strength carriers of the arms 11 corresponds to the slope of the wires 9, but said strength carriers and said wires extend in such a way that they cross each other. In this way (as shown in FIG. 5) a triangular formation results which prevents a spreading or an enlargement of the mutual wire spacing from occurring not only in the region of the edges 5' but also in the region of the upper edges of the bead reinforcer 8. To a certain degree a blocking occurs which prevents opening movements at the free lying edges.

Pursuant to the specific embodiment of FIG. 3, a U-shaped strip 10 is likewise provided, but this strip 10 only surrounds the laterally outwardly lying section of the bead reinforcer 8. Pursuant to FIG. 4, two strips 12 are provided which are essentially parallel to one another and which accommodate between each other the looped around portion 5 and that portion of the bead reinforcer 8 which is parallel to the portion 5. With the embodiments pursuant to FIGS. 2 and 3, a thread pattern of the strength carriers results as is shown in FIG. 5, although the embodiment of FIG. 2 offers an advantage because strip 10 overlaps both free ends in the bead region.

It is, of course, to be understood that the present invention is by no means limited to the specific showing in the drawing, but also encompasses any modifications within the scope of the appended claims.

What we claim is:

1. A pneumatic vehicle tire which includes bead portions, side walls, and a tread surface, each of said bead portions comprising in combination:

a bead core;

a single layer radial carcass of high strength material having one end portion thereof which is anchored in said bead portion by being looped around said bead core, that portion of said carcass which is looped around said bead core extending laterally outwardly of said bead portion over a portion up to approximately half of the height of the pertaining side wall;

bead reinforcing means located laterally outwardly of and next to said looped around portion of said carcass, said bead reinforcing means having free ends and comprising first strength carriers which are substantially parallel to one another and slanted with regard to the circumferential direction of said tire and to said carcass;

strip means associated with and extending radially inwardly to about the heel of said bead core as well as extending parallel to the radially outwardly lying free end of said bead reinforcing means, said strip means comprising second strength carriers which are substantially parallel to one another and oppositely slanted with regard to the circumferential direction of said tire, said first and second strength carriers crossing one another in such a way as to form a practically non-deformable triangular formation with said looped around portion of said carcass for maintaining the mutual spacing between the respective strength carriers, said practically non-deformable triangular formation providing uniform stiffening effect around bead core as well as over the entire height of said bead reinforcing means located laterally adjoining said bead core.

2. A tire in combination according to claim 1, in which that portion of said single layer carcass which is looped around its pertaining bead portion extends outwardly of said bead portion within the range of from ⅓ to about one half the height of the pertaining tire side wall.

3. A tire in combination according to claim 2, in which said first and second strength carriers are slanted in such a way as to form angles of between about 15°–45° with the circumferential direction of said tire.

4. A tire in combination according to claim 3, in which said strip means is approximately U-shaped and surrounds not only at least a part of said looped around portion of said single layer carcass but also that portion of said bead reinforcing means adjacent thereto.

5. A tire in combination according to claim 3, in which said strip means is approximately U-shaped and surrounds only that portion of said bead reinforcing means which is adjacent to said looped around portion of said single layer carcass.

6. A tire in combination according to claim 3, in which said strip means comprises two strips which are substantially parallel to each other and accommodate between each other at least one of the looped around portions of said single layer carcass and that portion of said bead reinforcing means which is located adjacent thereto.

7. A tire in combination according to claim 3, in which said strip means extends inwardly from the pertaining side wall to about the heel of said bead portion.

8. A tire in combination according to claim 3, in which said second strength carriers are made of a textile material, and in which said first strength carriers and said carcass layer are made of high strength material.

9. A tire in combination according to claim 8, in which said textile material is polyamide.

10. A tire in combination according to claim 8, in which said high strength material is steel.

11. A tire in combination according to claim 3, in which said strip means is approximately U-shaped, and has two substantially parallel arms, the space between said arms comprising a tough rubber mixture having a Shore A hardness of 70.

12. A tire in combination according to claim 3, in which said strip means comprises two strips which are substantially parallel to and spaced from each other, the space between said strips comprising a tough rubber mixture having a Shore A hardness of 70.

13. A tire in combination according to claim 3, in which at least one of the looped around portions of said single layer carcass and that portion of said bead reinforcing means which is located adjacent thereto is embedded in a tough rubber mixture.

* * * * *

UNITED STATES PATENT AND TRADEMARK OFFICE
CERTIFICATE OF CORRECTION

PATENT NO. : 4,234,029
DATED : November 18, 1980
INVENTOR(S) : JULIUS PETER ET AL It is certified that error appears in the above—identified patent and that said Letters Patent is hereby corrected as shown below:

On the title page, the following should be added:

[30]   Foreign Application Priority Data

July 8, 1976 [DE] Fed. Rep. of Germany...2630657

Signed and Sealed this

Seventeenth Day of February 1981

[SEAL]

*Attest:*

*Attesting Officer*

RENE D. TEGTMEYER

*Acting Commissioner of Patents and Trademarks*